(12) United States Patent
Colon (10) Patent No.: US 12,154,433 B2
(45) Date of Patent: Nov. 26, 2024

(54) METHOD AND SYSTEM FOR MANAGING PARKING SPACES

(71) Applicant: VULOG, Nice (FR)

(72) Inventor: François Colon, Marseilles (FR)

(73) Assignee: VULOG, Nice (FR)

( * ) Notice: Subject to any disclaimer, the term of this patent is extended or adjusted under 35 U.S.C. 154(b) by 137 days.

(21) Appl. No.: 17/619,059

(22) PCT Filed: Jun. 19, 2020

(86) PCT No.: PCT/FR2020/051073
§ 371 (c)(1),
(2) Date: Dec. 14, 2021

(87) PCT Pub. No.: WO2020/254773
PCT Pub. Date: Dec. 24, 2020

(65) Prior Publication Data
US 2022/0358841 A1   Nov. 10, 2022

(30) Foreign Application Priority Data

Jun. 19, 2019  (FR) ...................... 1906619

(51) Int. Cl.
*G08G 1/14*    (2006.01)
(52) U.S. Cl.
CPC ......... *G08G 1/149* (2013.01); *G06Q 2240/00* (2013.01)
(58) Field of Classification Search
CPC ........ G06Q 10/02; G06Q 10/04; G06Q 10/06; G06Q 50/30; G06Q 2240/00; G07B 15/02; G07F 9/001; G08G 1/0112; G08G 1/04; G08G 1/042; G08G 1/095; G08G 1/14; G08G 1/143; G08G 1/144; G08G 1/147; G08G 1/148; G08G 1/149
USPC ....................................... 340/932.2
See application file for complete search history.

(56) References Cited

U.S. PATENT DOCUMENTS

| 7,834,778 | B2 * | 11/2010 | Browne | ................... G08G 1/14 |
| | | | | 705/13 |
| 9,123,058 | B2 * | 9/2015 | Ricci | ..................... G08G 1/0116 |
| 2004/0222903 | A1 * | 11/2004 | Li | ............................ G08G 1/14 |
| | | | | 705/13 |

(Continued)

FOREIGN PATENT DOCUMENTS

WO    2019010580 A1    1/2019

OTHER PUBLICATIONS

International Search Report issued on Oct. 23, 2020, in corresponding International Application No. PCT/FR2020/051073; 5 pages (with English Translation).

*Primary Examiner* — Stephen R Burgdorf
(74) *Attorney, Agent, or Firm* — Maier & Maier, PLLC (57) ABSTRACT

A method for managing parking spaces for vehicles, which spaces are located in a geographical area and are associated with a controller, configured to allocate one or more parking characteristics to said spaces, the method including collection and storage of historical navigation data of identified vehicles and/or of identified drivers, statistical analysis of said stored data to predict the use of the spaces by the identified vehicles and/or the identified drivers, and modification of one or more parking characteristics allocated by the controller according to predicted space use.

11 Claims, 6 Drawing Sheets

(56) References Cited

U.S. PATENT DOCUMENTS

| | | | |
|---|---|---|---|
| 2012/0095792 A1* | 4/2012 | Stefik | G06Q 50/30 |
| | | | 705/13 |
| 2012/0188101 A1* | 7/2012 | Ganot | G07B 15/02 |
| | | | 340/932.2 |
| 2012/0299749 A1 | 11/2012 | Xiao et al. | |
| 2014/0236645 A1* | 8/2014 | Aaron | G06Q 10/02 |
| | | | 705/5 |
| 2014/0249742 A1* | 9/2014 | Krivacic | G08G 1/14 |
| | | | 340/932.2 |
| 2016/0171891 A1* | 6/2016 | Banatwala | G08G 1/144 |
| | | | 340/932.2 |
| 2016/0180712 A1 | 6/2016 | Rosen et al. | |
| 2018/0137439 A1* | 5/2018 | Galano Triviño | G06Q 10/02 |
| 2018/0268617 A1* | 9/2018 | Bruce | G08G 1/146 |
| 2018/0374349 A1 | 12/2018 | Mowatt | |

* cited by examiner

METHOD AND SYSTEM FOR MANAGING PARKING SPACES

TECHNICAL FIELD

The invention relates to a method and a system for managing parking spaces.

The field of the invention relates to the technical field of sending instructions for controlling parking spaces.

BACKGROUND

Generally, the use of public or private parking spaces is based on a first come, first served basis. Traffic congestion is frequent when all parking spaces are occupied in a geographical area and drivers are forced to wait for spaces to become available. In addition, drivers may be frustrated by searching for a parking space and discouraged from traveling to geographic areas where parking is difficult.

Patent documents US2014/0249742, US2016/180712, US2018/0137439, U.S. Pat. No. 7,834,778, US2014/0236645, WO2016/6084041 or WO2018/232889 describe various systems and methods for managing parking space reservations such that the driver is efficiently directed to available and identified parking spaces. These systems generally allow a driver to reserve an available parking space in advance. However, if no parking space is available at the time of reservation, no reservation can be made.

Document US2012/0095812 partially resolves this disadvantage. This document describes a method for managing parking spaces. These spaces are associated with a parking time indicator driven by a controller configured to allocate an authorized parking time. This system makes it possible to modulate the authorized parking time according to a reservation of a parking space. For example, a driver wants to reserve a space at a certain time. The indicator can thus display the time remaining until the reservation time (for example, a 60-minute countdown, 1 hour before the reservation), such that other drivers know how long they can park their vehicle in that space and when they will have to release it. The process of adjusting the authorized parking time is initiated, in this case, by a voluntary action of the driver, namely the actual reservation of a parking space. This advance reservation is the triggering element for the modulation process. A driver who has not made a prior reservation cannot be sure of finding a parking space.

An aim of the invention is to overcome this state of affairs. Another aim of the invention is to enable drivers to efficiently find available parking spaces, even without any prior reservation. Also, another aim of the invention is to make parking spaces available in order to reduce traffic congestion on the streets and to improve the experience of drivers wanting to park.

SUMMARY

The solution proposed by the invention is a method for managing parking spaces for vehicles, which spaces are located in a geographical area and are associated with a controller configured to allocate one or more parking characteristics to said spaces. The method comprises the following steps:
- collection and storage of historical navigation data of identified vehicles and/or identified drivers,
- statistical analysis of said stored data to predict the use of the spaces by the identified vehicles and/or identified drivers,
- modification of one or more parking characteristics allocated by the controller based on predicted space use.

The modification of parking characteristics of spaces occurs at the time an identified driver/vehicle is potentially expected to arrive in a geographical area. The process is no longer initiated by a prior action of the driver, but by the result of a statistical analysis. The latter is based on navigation observations from which plausible events are established to predict the use of spaces by identified vehicles and/or identified drivers, from an arrival time, and in a determined geographical area. This dynamic management of parking spaces increases supply, such that a driver no longer needs to make a prior reservation for a parking space to find a space to park. They are almost guaranteed to find a free space when they arrive in the geographical area. Traffic congestion on the streets is reduced and the driver's experience is improved.

Other advantageous characteristics of the invention are listed below. Each of these characteristics can be considered individually or in combination with the noteworthy characteristics defined above, and can be the subject of one or more divisional patent applications:

According to one embodiment, the method comprises the following steps:—collecting and storing historical space occupancy data;—determining a number of free spaces as a result of predicting space use;—calculating an occupancy rate of said free spaces, which calculation is based on a statistical analysis of said stored historical data.

According to one embodiment, the method comprises a step of selecting at least one parking characteristic to be modified from a plurality of parking characteristics allocated by the controller, which selection depends on the calculated occupancy rate.

According to one embodiment, the method consists of modifying the parking characteristic(s) only if the calculated occupancy rate is greater than or equal to a threshold value.

According to one embodiment, the method comprises a step of further modifying at least one parking characteristic allocated to a parking space when said space is used by an identified vehicle and/or an identified driver.

According to one embodiment, the method consists of modulating the duration of the authorized parking time allocated by the controller to the spaces and/or modulating the pricing applied by the controller when using the spaces and/or placing the spaces in a "reserved" status.

According to one embodiment, the method comprises a step of estimating an arrival time of at least one of the identified vehicles and/or at least one of the identified drivers, in the geographical area, the parking characteristic(s) being changed prior to said estimated arrival time.

According to one embodiment, the method comprises the following steps:—modifying one or more parking characteristics prior to the estimated arrival time;—modifying another one or more parking characteristics from the estimated arrival time.

According to one embodiment, the method comprises the following steps:—modification of one or more parking characteristics if, before the estimated arrival time, a space is occupied by an unidentified vehicle and/or an unidentified driver;
different modification of said characteristic(s) if, from the estimated arrival time, said space is occupied by an identified vehicle and/or an identified driver.

Another aspect of the invention relates to a system for managing parking spaces for vehicles, which spaces are located in a geographical area and are associated with a controller configured to allocate the parking characteristics to said spaces, the system comprising:
- a database wherein vehicles and/or drivers are identified,
- a means for collecting historical navigation data of identified vehicles and/or identified drivers,
- a database wherein said collected data is stored,
- a computer server adapted for:
  - carrying out a statistical analysis of said stored data to predict the use of the spaces by the identified vehicles and/or the identified drivers,
  - generating and sending instructions to the controller to modify the parking characteristics allocated by said controller, according to the predictions of the use of the spaces.

Also, another aspect of the invention relates to a system comprising a computer server (SERV) configured to implement the method according to one of the preceding characteristics.

Also, another aspect of the invention relates to a computer program product comprising code instructions for executing a method according to one of the preceding characteristics, when it is executed by a processing unit of a computer server.

BRIEF DESCRIPTION OF THE FIGURES

Other advantages and characteristics of the invention will appear better upon reading the description of a following preferred embodiment, in reference to the appended drawings, made as indicative and non-limiting examples and wherein.

DETAILED DESCRIPTION OF THE EMBODIMENTS

The method and the system of the invention generate handlings of physical elements, in particular signals (electric or magnetic) and digital data, capable of being stored, transferred, combined, compared, etc., and making it possible to achieve a desired result.

The invention implements one or more computer applications executed by computer equipment or servers. For the sake of clarity, it must be understood in the sense of the invention that "a piece of equipment or server does something" means "the computer application executed by a processing unit of the equipment or server does something". Just as "the computer application does something" means "the computer application executed by the processing unit of the equipment or server does something".

Also, for clarity, the present invention can make reference to one or more "logical computer processes". The latter correspond to the actions or results obtained by the execution of instructions from various computer applications. Also, it must be understood in the sense of the invention that "a logical computer process is adapted to do something" means "the instructions of a computer application executed by a processing unit do something".

Also, for clarity, the following clarifications are made to certain terms used in the description and claims:
- "Computer Resource" can be understood in a non-limiting way, as: component, hardware, software, file, computer network connection, amount of RAM memory, hard drive space, bandwidth, processor speed, number of CPUs, etc.
- "Computer server" can be understood in a non-limiting way as: computer device (hardware or software) with computer resources to perform the functions of a server and which offers services, computer, plurality of computers, virtual server on the Internet, virtual server in the Cloud, virtual server on a platform, virtual server on a local infrastructure, server networks, cluster, node, server farm, node farm, etc.
- "Service" can be understood in a non-limiting way as the set of functionalities proposed and ensured by a server and/or by at least one piece of equipment connected to said server through a network. The service can comprise, for example, the following functionalities: automatic provision of parking spaces, reservation of a vehicle, location of a vehicle, remote locking/unlocking of a shared vehicle, etc.
- "Request" means an execution order which can follow a communication protocol and comprising input parameters (question, information, etc.) and possibly return parameters (answer, information, etc.), which can be in a format related to the protocol used.
- "Processing unit" can be understood in a non-limiting way as: processor, microprocessors, CPU (for Central Processing Unit).
- "Hardware" means one or more pieces of computer equipment and can be understood in a non-limiting way as hardware.
- "Computer application" can be understood as: software, computer program, etc.
- "Computer network" can be understood in a non-limiting way as: computer bus, personal area network (PAN), local area network (LAN, WLAN, etc.), wide area network (WAN), Internet network, intranet network, extranet network. The computer network is a set of computer equipment connected together to exchange, in a secured or not way, information and/or data according to a communication protocol (ISDN, Ethernet, ATM, IP, CLNP, TCP, HTTP, etc.).
- "Database" can be understood in a non-limiting way as a structured and organized set of data recorded on media accessible by computer equipment and capable of being interrogated, read and updated. Data can be inserted, retrieved, modified and/or destroyed. Management and access to the database can be provided by a set of computer applications which constitute a database management system (DBMS).
- "Car sharing" is a vehicle made available to "customers" or members. The vehicle can be: an autonomous car, a car (combustion and/or electric engine), a motorized two-wheeler (combustion and/or electric engine), a bicycle (conventional or with electric assistance), a scooter (conventional or with electric assistance), a skateboard, an electric unicycle, a Segway, a boat, etc.

"Fleet" can be understood as a plurality of vehicles owned or managed or affiliated with a company, public agency, cooperative, association, group of individuals, etc.

Such as used here, unless otherwise specified, the use of ordinal adjectives "first", "second", etc., to describe an object simply indicates that various occurrences of similar objects are mentioned and does not imply that the objects thus described must be in any given sequence, whether in time, space, classification, or any other way.

Architecture.

A car-sharing service is a system wherein a company, public agency, cooperative, association, or group of individuals makes a fleet of vehicles available to customers or service members. Rather than having a personal vehicle, the user of the service has a vehicle that they pay for only for the duration of their need. In other words, when a user uses a car share, they are charged a certain amount. The amount charged generally depends on the number of kilometers driven and/or the time the vehicle is used and/or the model or type of vehicle. The rest of the time, the vehicle is intended to be used by other members.

One of the advantages of car sharing resides in the fact that a user can release their vehicle wherever they want. The position of these vehicles is therefore not fixed in time, but freefloating, such that it is generally difficult to predict their location in advance.

Figure 1:
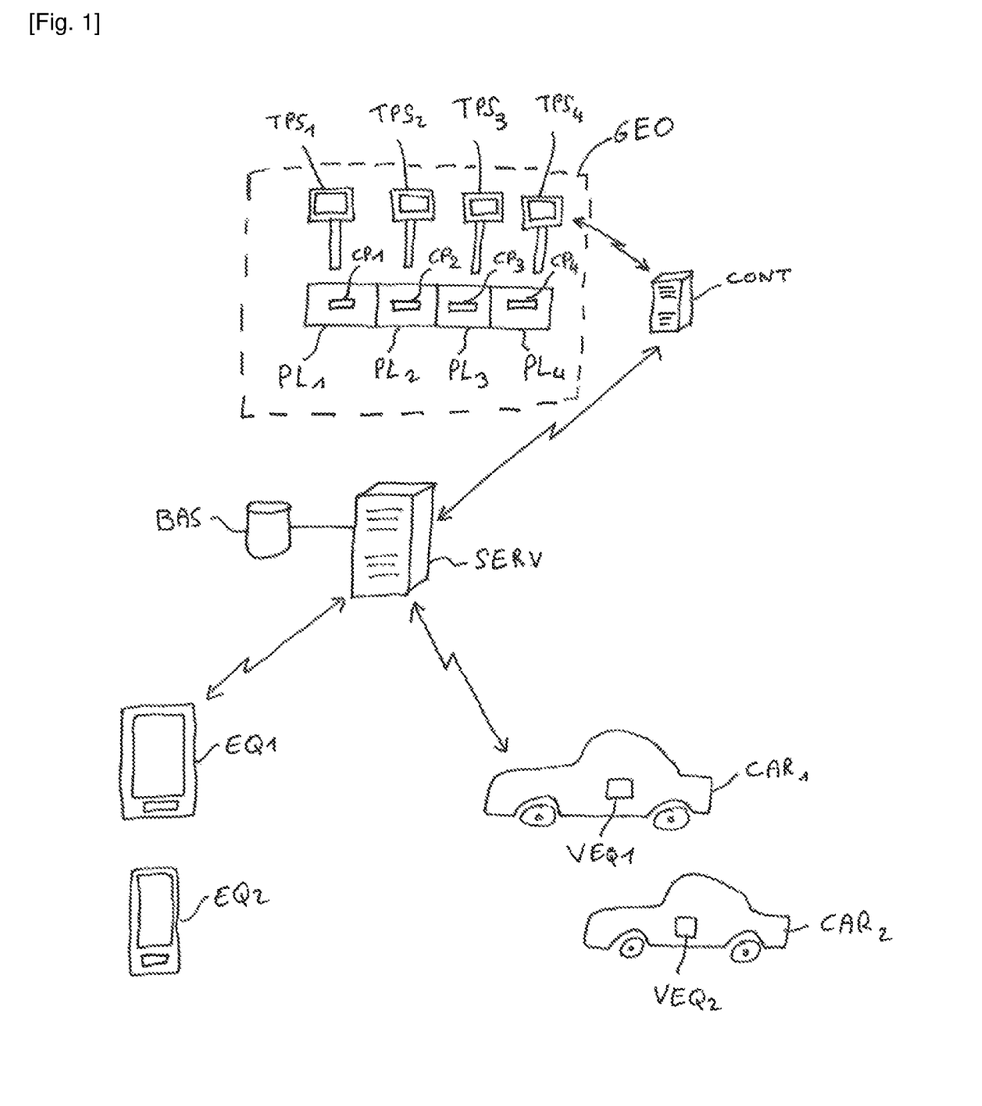
FIG. 1 illustrates an example of an embodiment of a system for implementing the invention.

In FIG. 1, the system for implementing the method of the invention comprises a computer server SERV connected to a database BAS, transport vehicles $CAR_1$, $CAR_2$, computer equipment $EQ_1$, $EQ_2$, parking spaces $PL_1$-$PL_4$ located in a given geographical area GEO, authorized parking time indicators $TPS_1$-$TPS_4$ associated with each of the spaces PL1-PL4. TPS1-TPS4 indicators are controlled by a controller CONT.

Computer equipment $EQ_i$ belongs to drivers. They each comprise a communication interface, for example GSM, 3G, 4G or Wi-Fi, to establish a wireless communication link with the server SERV through a computer network, for example an Internet network, relying on an infrastructure allowing to route wireless communications coming from the equipment $EQ_i$. The latter is preferably a smartphone, a digital tablet, a laptop computer, etc. It comprises computer resources, for example an executable code of a downloadable computer application, allowing to fulfill the functions of the method of the invention.

According to one embodiment, each driver is identified to a rights management server which can or cannot be the remote server SERV. To simplify the rest of the description, it is considered that the rights management server is the server SERV. A driver identified with the server SERV can then access a service corresponding to the automatic reservation of a parking space. A driver is identified by registering with the server. This registration can be done with a web service of a remote server associated with the service. The registration comprises, for example, the registration of a driver ID and a network address of the driver equipment $EQ_i$. This can be a port, an IP address, a MAC address or any other address or combination of address elements that can identify a piece of driver equipment $EQ_i$. According to one embodiment, a driver is preregistered from a piece of software and is known by the fact that their ID is stored in the database BAS. According to one embodiment, the database BAS associates a vehicle CAR with a driver when the latter uses said vehicle. According to one embodiment, the server SERV comprises a function making it possible to perform the associations.

The vehicles $CAR_1$-$CAR_2$ can be autonomous cars, electric cars, car-sharing cars, motorized two-wheelers, bikes, scooters, skateboards, electric unicycles, Segways, etc. The vehicles $CAR_1$-$CAR_2$ are preferably part of a car-sharing fleet. Each vehicle $CAR_i$ has a unique identification number. Advantageously, each vehicle $CAR_i$ has at least one piece of equipment $VEQ_i$ comprising a communication interface, for example GSM, 3G, 4G or Wi-Fi, to establish a wireless communication link with the server SERV through a computer network. The equipment $VEQ_i$ are preferably embedded computers comprising computer resources making it possible to fulfill the functions of the method of the invention. The server SERV assigns statuses to each vehicle $CAR_i$:

status called "Available for reservation": the vehicle is parked and not reserved, status called "Unavailable for reservation": either the vehicle is parked but already reserved by a user (status "Unavailable-Reserved"), or the vehicle is in operation (status "Unavailable-in operation").

Other similar types of statutes can be provided.

The server SERV regularly updates, preferably in real time, the vehicle $CAR_1$-$CAR_2$ database. This database BAS groups together, in particular: the ID of each vehicle, their status ("Available for reservation" or "Unavailable for reservation"), and their geographical position. Other information and/or data can be grouped together in the database BAS, if necessary.

Information on the status of a vehicle $CAR_i$ is sent to the server SERV in real time or at predefined time intervals (for example, every 5 minutes). This information can be sent to the server SERV:

through the embedded equipment $VEQ_i$ of the vehicle $CAR_i$ following a detection of an event. This event is, for example, generated automatically as soon as the vehicle $CAR_i$ is started or by an action of the driver on a specific control fitted on said vehicle. This control can be actuated when the driver has released the vehicle after a trip. The status thus changes from "Unavailable for reservation" to "Available for reservation", through the equipment $EQ_i$ of the driver of the vehicle $CAR_i$, following an action of said driver on their equipment. For example, the driver can press a dedicated button displayed on a touchscreen of their equipment, after having parked and released their vehicle. The status thus changes from "Unavailable for reservation" to "Available for reservation", When the server SERV receives a reservation request from a driver who subscribes to a car-sharing service, and can fulfill that request (i.e. that a vehicle is available for reservation), said server changes the status of a vehicle from "Available for reservation" to "Unavailable for reservation". This reservation request can for example be generated through electronic equipment or through a computer application to which the driver subscribes.

The geographical position of each vehicle $CAR_i$ can be obtained by satellite (GPS or Galileo system) or by a triangulation system (for example, a system using the cells of a 4G network) or by a combination of both location systems. The equipment $VEQ_i$ of a vehicle $CAR_i$ advantageously comprises a component, for example a GPS component, making it possible to obtain geo-location information which can be retrieved by the server SERV. The server SERV can automatically retrieve this information by interrogating in real time or at regular time intervals (for example, every 5 minutes), the equipment $VEQ_i$ of the vehicles $CAR_i$. The equipment $VEQ_i$ can also automatically send this information to the server SERV (without responding to an interrogation request), in real time or at regular time intervals (for example, every 5 minutes).

According to an alternative, the geographical position of a vehicle $CAR_i$ can correspond to a position defined from an input interface of a piece of equipment $EQ_i$ of a driver using said vehicle. For example, the driver can evaluate a position from an interactive map displayed on a graphic interface of their equipment $EQ_i$. This position is then sent to the server SERV.

According to another alternative, the geographical position of a vehicle $CAR_i$ can correspond to the position of the equipment $EQ_i$ of the driver using said vehicle. The latter can therefore be without equipment $VEQ_i$. The equipment $EQ_i$ advantageously comprises a component, for example a GPS component, which makes it possible to obtain geo-location information which is sent to the server SERV. The server SERV can automatically retrieve this information by interrogating the equipment $EQ_i$ of the drivers in real time or at regular intervals. The equipment $EQ_i$ can also automatically send this information to the server SERV (without responding to an interrogation request), in real time or at regular time intervals. This geo-location information coming from a piece of equipment $EQ_i$ also makes it possible for the server SERV to know the geographical position of a driver who subscribes to the service, but who does not use a vehicle $CAR_i$.

The parking spaces $PL_i$ are spaces located on streets, sidewalks, public or private parking lots, or any physical location. These spaces $PL_i$ are located in the geographical area GEO. This geographical area can correspond to a street, a group of streets, a district, a specific place such as a parking lot, etc. The geographical position of each space $PL_i$ is advantageously known from the server SERV and recorded in the database BAS. Each space $PL_i$ is advantageously associated with a unique identification number recorded in the database BAS.

Each space $PL_i$-$PL_4$ is also advantageously equipped with a sensor CP1-CP4 to determine if said space is occupied by a vehicle. Each sensor CPi can be connected to an authorized parking time indicator TPSi, to the controller CONT, or to the server SERV. The sensors CP1-CP4 can be networked through a wired or wireless connection. The determination of the occupancy or availability of a space $PL_i$ is sent in real time to the controller CONT and/or to the server SERV.

The sensors $CP_1$-$CP_4$ can be optical sensors (for example, cameras, photoelectric detectors), inductive presence sensors (for example, inductive loop), capacitive presence sensors, magnetic presence sensors (for example, magnetometers), ultrasonic presence sensors, etc. It is advantageous to have one sensor per parking space, but a sensor (for example, a camera) could be positioned to monitor several spaces simultaneously.

According to the status of the sensors $CP_1$-$CP_4$, the server SERV can allocate statuses to each space $PL_1$-$PL_4$, and in particular the following statuses:
  status called "unoccupied": the sensor does not detect any vehicle parked in the space,
  status called "occupied": the sensor detects a vehicle parked in the space, Each space $PL_1$-$PL_4$ can be equipped with an authorized parking time indicator $TPS_1$-$TPS_4$ and/or indicator of the pricing applied during the use of said spaces. Each indictor $TPS_i$ is connected to the controller CONT either by wire or wirelessly. They can also be networked, with one single indicator being connected to the controller CONT and acting as the master, the other indicators being slaves. The indicators $TPS_1$-$TPS_4$ show how long and/or at what rate vehicles can use the spaces $PL_1$-$PL_4$.

Each indicator $TPS_i$ can comprise a physical interface (for example, an LCD screen and/or speaker) that visually and/or audibly indicates the status of a space $PL_i$ and/or the authorized parking time and/or the applied pricing. For example, a space $PL_i$ can have the following statuses:
  status called "available": no vehicle is parked in the space, any vehicle (identified or not by the server SERV) could park in the space,
  status called "unavailable": a vehicle is parked in the space, no other vehicle (identified or not by the server SERV) could park said space; or the space is temporarily prohibited.
  status called "reserved": no vehicle is parked in the space, but only one identified vehicle or type of vehicle (for example, a shared vehicle), or an identified driver (for example, a driver who is a subscriber to a car share service), is authorized to park in said space.

Each status can be clearly displayed on the indicator interface $TPS_1$-$TPS_4$ and/or be associated with a color code. For example, blue for an "available" status, red for an "unavailable" status and yellow for a "reserved" status. These color codes can be implemented using light sources integrated into the indicators $TPS_1$-$TPS_4$.

The SERV server regularly updates, preferably in real time, the database of spaces $PL_i$. The database BAS in particular groups together: the ID of each space, their geographical position, the history of their status ("unoccupied" or "occupied", "available", "unavailable", "reserved", on what date, at what time, for how long, etc.). Other information and/or data relating to the spaces $PL_i$ can be grouped together in the database BAS, if necessary.

The authorized parking time is also clearly indicated on the indicator interface $TPS_1$-$TPS_4$. For example 2 hours, 1 hour, 10 minutes, 5 minutes, etc. The time display can be presented in the form of a countdown that starts as soon as a vehicle is detected in a space $PL_i$ and indicating the remaining allocated time.

The applied pricing can also be indicated on the indicator interface $TPS_i$-$TPS_4$. For example €0.20/minute, €10/hour, etc.

In another embodiment, the interface indicating the authorized parking time and/or the status of a space and/or the pricing applied, can be virtual and displayed on a screen of the equipment $EQ_i$ of a driver or on a screen of the equipment $VEQ_i$ of a vehicle $CAR_i$ parked in a space.

In another embodiment, one single indicator $TPS_i$ can be provided for several spaces $PL_1$-$PL_4$ with indications indicating the status of each of said spaces and/or the authorized parking time and/or the applied pricing.

The controller CONT is presented in the form of a computer or a processing unit with all the resources and hardware making it possible to perform the functionalities described in the present description. The controller CONT can be integrated in one of the indicators $TPS_i$ or be disposed in a dedicated box located near said indicators. The controller CONT is configured to allocate parking characteristics to the spaces $PL_1$-$PL_4$, these characteristics can be changed in response to receiving instructions coming from the server SERV. In FIG. 1, the controller makes it possible in particular to control the indicators $TPS_1$-$TPS_4$. It receives instructions coming from the server SERV and sends instructions to the indicators $TPS_1$-$TPS_4$, in particular instructions making it possible for them to indicate the status of a space $PL_i$ and/or the authorized parking time and/or the pricing to be applied (i.e. the parking characteristics).

The controller CONT comprises a communication interface, for example GSM, 3G, 4G or Wi-Fi, to establish a wireless communication link with the server SERV through a computer network, for example an Internet network. The controller can thus return to the server SERV, in real time or at regular time intervals, various information such as: the status of the sensors $CP_1$-$CP_4$ and therefore the status of each of the spaces $PL_1$-$PL_4$ ("occupied" or "unoccupied"); the time allocated to each of said spaces; the time allocated remaining for each occupied space; an overrunning of the allocated time; the pricing applied, etc.

Method.

According to a characteristic of the invention, a predictive model is built based on a statistical analysis of observation data, with the aim of predicting the use of the spaces $PL_1$-$PL_4$, at a given time, by identified drivers/vehicles. The aim is that spaces $PL_1$-$PL_4$ are available when the vehicles $CAR_1$-$CAR_2$ arrive in the geographical area GEO. Spaces can thus be freed up for drivers and/or "priority" vehicles in order to reduce traffic congestion and pollution. These priority drivers/vehicles are, for example, drivers who have joined a car-sharing service, electric vehicles, car-pooling vehicles, etc. These can also be delivery drivers and/or trucks that need to be unloaded at a certain time by being parked in parking spaces, rather than in the middle of a traffic lane. The priority drivers/vehicles that should be given priority in this case, are those identified by the server SERV.

Observation data is historical navigation data of identified vehicles and/or identified drivers.

Since the database BAS contains the ID of each identified vehicle $CAR_i$ and/or each identified driver and their respective geographical position, the server SERV can easily determine, from this collected data, their respective journeys during a day, a week, a month, a year, etc. The statistical analysis of this data will allow the server SERV to anticipate the route of the identified vehicles $CAR_1$-$CAR_2$ and/or of the identified drivers and to estimate a number of vehicles likely to park in the parking spaces $PL_1$-$PL_4$, from an arrival time in a determined geographical area.

Statistical analysis is based on automated reasoning of the server SERV which leads to probabilistic- and/or statistically-based determinations. The server SERV can thus define actions from a set of observed events and/or from observed event data. The statistical analysis of the data can be based on various known data modeling techniques, and preferably a Bayesian network. A Bayesian network is a probabilistic model representing random variables and their conditional dependencies through a DAG (Directed Acyclic Graph) and probability tables. It is mainly used to represent knowledge, give a decision rule, predict, and determine causal events. A person skilled in the art can refer, in particular, to the following publications relating to Bayesian networks: BRIDE, "*Methods for building Bayesian networks*", University of Strasbourg, August 2016, pages 1-34; HECKERMAN, "*A Bayesian approach to learning causal network*", MSR-TR-95-04, MicrosoftResearch, 1995; PEARL, "*Probabilistic Reasoning in Intelligent Systems: Networks of Plausible Inference*", (Morgan Kaufmann Publishers, 1988).

Other types of statistical analysis can be implemented by the server SERV such as: Markov model, neural networks, probabilistic models, logic and fuzzy logic reasoning, Gibbs sampling, etc.

Figure 2:
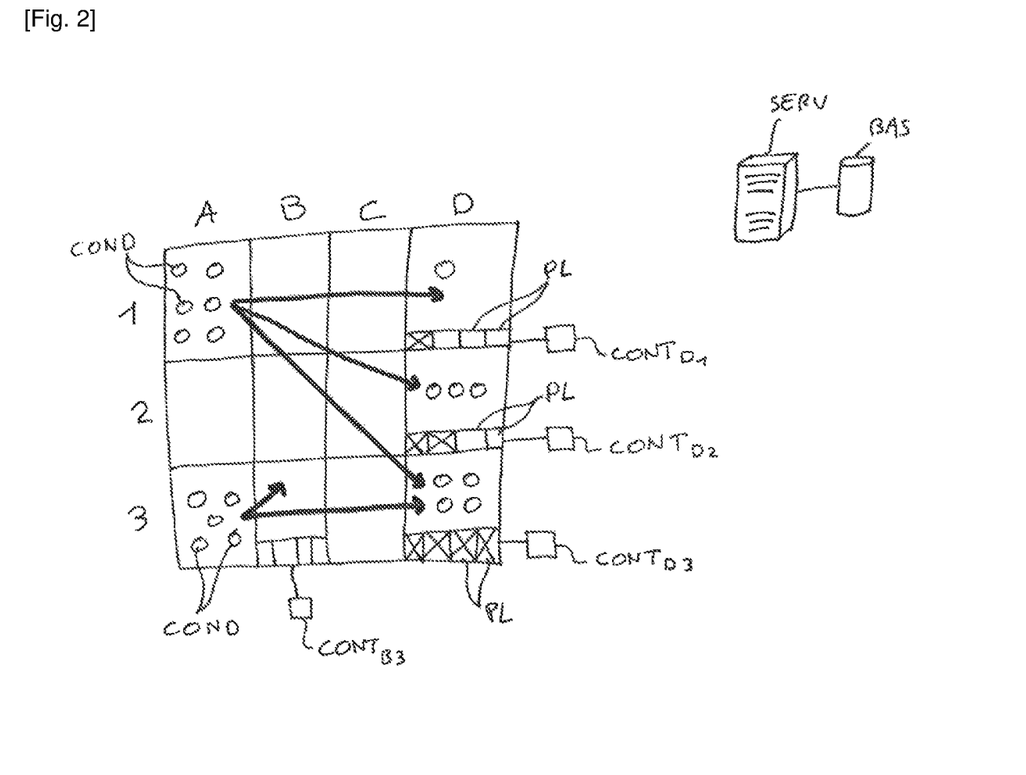
FIG. 2 illustrates an example of the results of a statistical analysis of historical navigation data.

FIG. 2 illustrates an example of the result of this statistical analysis. The different geographical areas $A_{1-3}$, $B_{1-3}$, $C_{1-3}$, $D_{1-3}$ represent, for example, districts or a street layout of a city. This splitting into geographical areas can be done automatically by the server SERV. The latter is, for example, adapted to connect to one or more databases of one or more dedicated websites, in particular digital mapping sites (for example, https://fr.mappy.com, https://www.viamichelin.fr) to retrieve a map and subdivide it into geographical areas. Areas $A_1$ et $A_3$ are called "departure areas" and areas $B_3$, $D_1$, $D_2$ and $D3_3$ are called "arrival areas".

Figure 3:
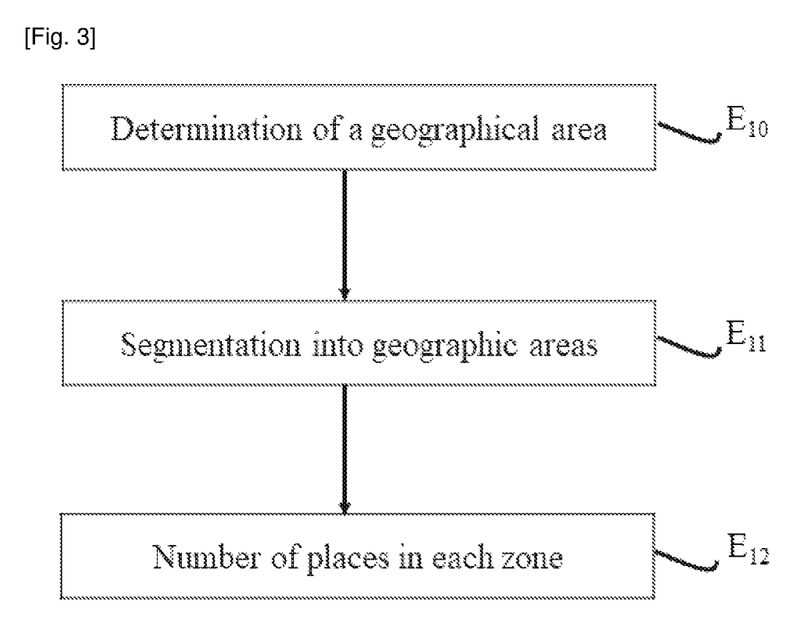
FIG. 3 is a flowchart illustrating the steps of a computer process allowing the server to define geographical areas.

FIG. 3 is a flowchart illustrating the steps of a computer process allowing the server SERV to define geographical areas, In step E10, the server SERV selects a geographical area (for example: a city) by retrieving a digital map from a dedicated website, for example. In step E11, the server SERV segments this geographical area into several geographical zones (for example: a street layout). In step E12, the server SERV interrogates the database BAS to know the number of parking spaces in each geographical area. According to one embodiment, for each geographical area, the server SERV interrogates the database BAS to know the spaces of which the geographical coordinates are included in those of said area.

For the sake of clarity and brevity, the rest of the description only makes reference to the observation of the behavior of drivers identified by the server SERV. The invention applies in the identical way to the observation of the behavior of vehicles identified by the server SERV.

At a time T0 (for example, on a Monday at 6:00 pm, when the offices close), the server SERV knows that there are 6 identified drivers COND in the departure area $A_1$ (for example, first office area) and 5 identified drivers COND in the departure area $A_3$ (for example, second office area). This information comes, in particular, from the geographical positions of the equipment EQ of the drivers retrieved in real time by the server SERV. This information can also be predicted following a statistical analysis of the historical geographical positions of said equipment at the time T0.

Through statistical analysis of the abovementioned historical navigation data, the server SERV predicts that for the drivers COND located in the departure area $A_1$: 17% will go to the arrival area $D_1$ (for example, commercial area), 50% will go to the arrival area $D_2$ (for example, residential area) and the remaining 33% will go to the arrival area $D_3$ (for example, city center). In the example of FIG. 2, the server SERV therefore predicts that: 1 driver will go to the arrival area $D_1$, 3 drivers will go to the arrival area $D_2$ and 2 drivers will go to the arrival area $D_3$.

The server SERV can also predict that for the drivers COND located in the departure area $A_3$: 60% will go to the arrival zone $B_3$ (for example, residential area), and 40% will go to the arrival zone $D_3$. In the example of FIG. 2, the server SERV therefore estimates that: 3 drivers will go to the arrival area $B_3$ and 2 drivers will go to the arrival area $D_3$.

Alternatively or complementarily, instead of predicting the departure of drivers from the departure areas $A_1$ and $A_3$ at the time T0, the server SERV predicts their arrival in the arrival areas $B_3$, $D_1$, $D_2$ and $D_3$. Thus, the server SERV can predict that at a time T1 (for example, on a Monday at 7:00 pm): 3 drivers will arrive in the arrival area $B_3$, 1 driver will arrive in the arrival area $D_1$, 3 drivers will arrive in the arrival area $D_2$ and 4 drivers will arrive in the arrival area $D_3$. The estimated number of vehicles which can reach each arrival area $B_3$, $D_1$, $D_2$ and $D_3$ can correspond to the predictions of using the spaces PL in each of said areas at the time T1.

The arrival time T1 can be estimated from a statistical analysis of the historical geographical positions of the drivers by the server SERV and/or from the historical data of the status of the spaces PL. The arrival time T1 can also be calculated from the departure time T0 and the distance between the departure and arrival areas.

The calculated T1 value can be weighted by contextual data such as day of the week, month of the week, actual traffic conditions or traffic predictions between the departure and arrival zones and various other random variables.

In particular, the server SERV can retrieve, from dedicated websites, data relating to road traffic between a departure and an arrival area. This traffic data is, for example: heavy traffic in such and such an area, or fluid traffic in such and such an area, closed traffic in such and such a street, roadworks in such and such a street, etc. The server SERV will then take this data into account for the calculation of the T1 value.

Figure 4:
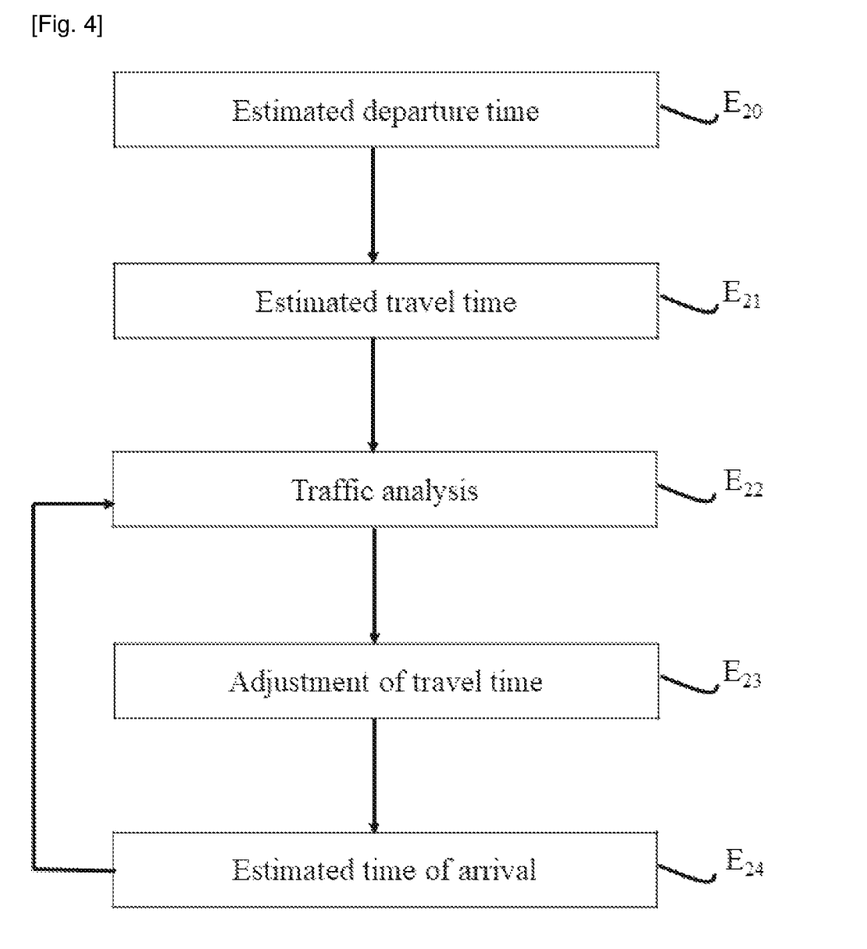
FIG. 4 is a flowchart illustrating the steps of a computer process allowing the server to estimate an arrival time.

FIG. 4 is a flowchart illustrating the steps of a computer process allowing the server SERV to estimate an arrival time T1. In step E20, the server SERV determines a departure time T0 from a departure area (for example: $A_1$). In step E21, the server SERV calculates the travel time between the departure area and an arrival area (for example: $D_3$). In step E22, the server SERV analyzes the road traffic status between $A_1$ and $D_3$. According to the result of this analysis, the server SERV adjusts the duration of the trip (step E23) to estimate the arrival time T1 (step E24). Steps E22 to E24 can be repeated in real time to best estimate the T1 arrival time dynamically.

In any case, the arrival time T1 estimated by the server SERV can differ from one arrival area to another, for example: 6:30 pm in area $B_3$, 6:45 pm in area $D_1$, 7:00 pm in area $D_2$, 7:30 pm in area $D_3$. Furthermore, the arrival time T1 can be a specific time or a threshold, for example from 6:30 μm to 7:00 μm in the area $B_3$, from 6:45 pm to 8:30 pm in the area $D_1$, from 7:00 μm to 7:30 pm in the area $D_2$, and from 7:30 μm to 9:00 μm in the area $D_3$. In particular, an arrival time threshold is determined by statistical analysis of the historical data stored in the database BAS.

The server SERV determines that there are 4 parking spaces PL in the arrival area $_{D1}$, 4 parking spaces PL in the arrival area $_{D2}$ and 4 parking spaces PL in the arrival area $D_3$. This information comes from the different geographical positions of the space registered in the database BAS. In the same way, the server SERV knows, at a given time (T0 and/or T1): the status of each of these space ("unoccupied", "occupied", "available", "unavailable", "reserved"); the time initially allocated to each of said spaces; the remaining time allocated for each occupied space; a possible overrunning of the allocated time; etc.

According to an aim of the invention, the drivers COND must be able to easily park in parking spaces PL when they reach the arrival areas $B_3$, $D_1$, $D_2$ and $D_3$, without having to make a prior reservation of a space as in known solutions of the prior art. Drivers must easily be able to find available spaces in the arrival areas in question, at the time when they reach said area or with a minimum waiting time.

One way to achieve this aim is to modify the parking characteristics allocated by the controllers $CONT_{B1}$, $CONT_{D1}$, $CONT_{D2}$, $CONT_{D3}$ according to the predictions of using the spaces PL in each geographical area $B_1$, $D_1$, $D_2$, $D_3$. The modified parking characteristics are preferably: the parking time allocated by the controllers $CONT_{B1}$, $CONT_{D1}$, $CONT_{D2}$, $CONT_{D3}$ and/or the pricing applied by said controllers to said spaces and/or the status of said spaces.

Using the example of FIG. 2, by statistical analysis, the server SERV predicts that 3 drivers will arrive in the arrival area $B_3$ from an estimated arrival time $T1_{B3}$ (for example, between 6:30 pm and 7:00 pm), that 1 driver/vehicle will arrive in the arrival area $D_1$ at an estimated arrival time $D_1$ (for example, between 6:45 pm and 8:30 pm), that 3 drivers/vehicles will arrive in the arrival area $D_2$ at an estimated arrival time T1D2 between 6:45 pm and 8:30 pm), that 3 drivers/vehicles will arrive in arrival area$_{D2}$ at an estimated arrival time $T1_{D2}$ (for example, between 7:00 μm and 7:30 pm) and that 4 drivers/vehicles will arrive in the arrival area $D_3$ at an estimated arrival time $T1_{D3}$ (for example, between 7:30 pm and 9:00 pm).

The logical computer process leading to the modification of the parking characteristics is initiated by the server SERV before the estimated arrival time, for example 30 minutes or 60 minutes before this time. The process can be started at the same time T0 for all the arrival areas (for example, 6:00 pm) or at a specific time for each arrival area.

For the arrival area $D_1$, the server SERV starts the process at 6:15 pm, for example ($T0_{D1}$). It interrogates the database BAS and analyzes that on the 4 spaces PL of the area $D_1$, one single space is currently occupied or unavailable (marked with a cross in FIG. 2), the other three spaces being free, i.e. unoccupied and available. Statistical analysis makes it possible to predict that only one single vehicle can park in the spaces of the arrival area $D_1$ between 6:45 pm and 8:30 μm. The number of free spaces (=3) is greater than the number of estimated vehicles (=1).

According to one embodiment, the server SERV does nothing in this case. In particular, it can be calculated that the risk is low that even the three free spaces in the arrival area $D_1$, are occupied between 6:15 pm ($T0_{D1}$) and 8:30 pm (end of $T1_{D1}$). This risk calculation is, for example, based on a statistical analysis of the historical occupancy data of the spaces PL in the area $D_1$ recorded in the database BAS (data related to the statuses "unoccupied" or "occupied", on which date, at which time, for how long, etc.). For example, the server SERV can calculate the average time that the spaces PL have an "occupied" status between $T0_{D1}$ and end of $T1_{D1}$. The occupancy rate is thus easily deduced from the ratio: {calculated average occupancy time}/{time between $T0_{D1}$ and end of $T1_{D1}$}. The server SERV can deduce from this data that the spaces PL, in the area $D_1$ have an occupancy rate of less than 10% on Mondays between 6:15 pm and 8:30 pm. There is therefore a high probability that at least one space remains free when the driver arrives in the area $D_1$ between 6:45 pm and 8:30 pm.

For the arrival area $B_3$, the server SERV starts the process at 6:00 μm, for example ($T0_{B3}$). By interrogating the database BAS, it analyzes that the 4 spaces PL of the area $B_3$ are all free. The server SERV has estimated that three vehicles can park in the spaces of the arrival area $B_3$. The number of free spaces (=4) is, in this case, greater than the estimated number of vehicles (=3), but to a lesser extent than for the area $D_1$.

According to a first event, the server SERV does nothing. It calculates that there is a low risk that three of the four free spaces in the arrival area $B_3$ will be occupied between 6:00 pm ($T0_{B3}$) and 7:00 pm (end of $T1_{B3}$). This risk calculation is similar to that described in the previous paragraph. The server SERV preferably performs a statistical analysis of historical data recorded in the database BAS, to determine that the spaces PL of the area $B_3$, have an occupancy rate of less than 2% on Mondays between 6:00 μm and 7:00 pm. Therefore, there is a high probability that at least three spaces remain free when drivers/vehicles arrive in the area $B_3$ between 6:30 pm and 7:00 pm.

According to another event, the server SERV analyzes that the spaces PL of the area $B_3$ have a high occupancy rate, for example equal to or greater than 50%, every Monday between 6:00 μm and 7:00 μm. There is therefore a significant risk that not all drivers arriving the area $B_3$ between 6:30 pm and 7:00 pm will find a free space.

In this case, the server SERV will modulate the authorized parking time allocated by the controller $CONT_{B3}$. For example, if the maximum parking time normally allocated is 120 minutes, the server SERV will lower this time to 10 minutes from at 6:00 μm. The server SERV can also initiate a countdown from 6:00 pm such that the spaces are available from 6:30 pm (start of $T1_{B3}$): a vehicle parking in a free space at 6:00 pm will have an allocated time of 30 minutes, another vehicle parking in a free space at 6:20 pm will have an allocated time of 10 minutes, another vehicle parking in a free space at 6:25 pm will have an allocated time of 5 minutes, etc.

Alternatively or complementarily, the server SERV can also modulate the pricing applied by the controller $CONT_{B3}$. For example, if the normal rate is €0.20/minute, the server SERV will increase this rate to €2/minute from 6:00 pm onwards, so as to make this rate prohibitive in order to encourage drivers to free up spaces as quickly as possible. This price increase can be fixed or progressive, becoming higher and higher the closer the driver gets to their estimated arrival time. The instructions for modulating parking time and/or pricing are generated by the server SERV and sent to the controller $CONT_{B3}$. The controller $CONT_{B3}$ thus controls the indicators associated with the free spaces PL such that they display the new authorized parking time now allocated and/or the new rate applied. This lowering of the authorized parking time and/or the increasing of the rate makes it possible to accelerate the turnover of parking spaces. Other vehicles and/or drivers not identified by the server SERV are authorized to park in the spaces PL of the area $B_3$, but they are encouraged to free up these spaces more quickly, such that the three identificate drivers COND arriving in the area $B_3$ between 6:30 pm (start of $T1_{B3}$) and 7:00 pm (end of $T1_{B3}$), will have a high probability of finding an available space, or at least, with a limited waiting time.

According to another embodiment, instead of modulating the parking time and/or the pricing, the server SERV modifies the status of the three free spaces PL in the area $B_3$ to place them in a "reserved" status. The instructions to change the status are generated by the server SERV and sent to the controller $CONT_{B3}$, which controls the indicators. The latter will display this status on their interface: only drivers identified by the server SERV are authorized to park in the spaces PL of the area $B_3$.

According to another embodiment, the server SERV modulates the parking time and/or pricing, and also modifies the status of the three free spaces PL of the area $B_3$. For example, the server SERV lowers the parking time and/or increases the rate between 6:00 pm ($T0_{B3}$) and 6:30 pm (start of $T1_{B3}$). And from 6:30 μm to 7:00 pm (end of $T1_{B3}$), every free space is automatically placed in a "reserved" status and/or subject to a higher price increase.

According to another embodiment, the server SERV modulates the parking time and/or the pricing and/or modifies the status of the free spaces of the area $B_3$, automatically, without prior calculation of the occupancy rate of the spaces PL.

The server SERV can automatically send a notification to the equipment VEQ of the identified vehicles CAR (and/or the equipment EQ of the identified drivers), informing them that spaces are reserved for them and/or that spaces will be available in the area $B_3$ when they enter it. This notification is preferably displayed on an interface of the equipment VEQ and/or EQ and/or is communicated by voice inside the vehicles CAR. This notification can be accompanied by a confirmation request of the type, "Could you please confirm that you are interested in this available space in the area $B_3$?". In case of confirmation, the server SERV maintains the process, and can send instructions to the equipment VEQ and/or EQ to go to the spaces made available. If this is not confirmed, the server SERV adjusts the process by decreasing the estimated number of vehicles.

For the arrival area $D_1$, the server SERV starts the process at 6:30 pm, for example ($T_{0D2}$). By interrogating the database BAS, it analyzes that two of the 4 spaces PL of the area $D_2$ are occupied or unavailable. The server SERV has estimated that three drivers/vehicles can park in the spaces of the arrival area $D_2$. The number of free spaces (=2) is, in this case, less than the number of estimated vehicles (=3). The server SERV acts by modifying the parking characteristics allocated by the controller $CON_{TD2}$. For example, the server SERV will modulate the parking time and/or the pricing from 6:30 pm onwards (lowering of the time or countdown and/or increasing of the pricing) such that the spaces which are free at 6:30 pm can be used by other vehicles, but will be free again from 7:00 pm onwards (start of $T_{1D2}$). The same applies to spaces that are occupied or unavailable at 6:30 pm but which are free again between 6:30 pm and 7:00 pm. From 7:00 μm to 7:30 pm (end of $T_{1D2}$), each free space is automatically placed in a "reserved" status.

For the arrival area $D_3$, the server SERV starts the process at 7:00 μm, for example ($T0_{D3}$). By interrogating the database BAS, it analyzes that two of the 4 spaces PL of the area $D_3$ are occupied or unavailable. The server SERV has estimated that four drivers/vehicles can park in the spaces of the arrival area $D_3$. The number of free spaces (=0) is, in this case, less than the number of estimated vehicles (=4). The server SERV acts and modulates the authorized parking time allocated and/or the pricing applied by the controller $CONT_{D3}$ such that the spaces which are occupied or unavailable at 7:00 μm and that become free between 7:00 pm and 7:30 pm (start of $T1_{D3}$), can be occupied by other vehicles, but are free again from 7:30 pm. From 7:30 μm to 9:00 pm (end of $T1_{D3}$), each free space is automatically placed in a "reserved" status.

Various ways making it possible for the server SERV to know that an identified driver is using one of the spaces in a geographical arrival area. For example, the server SERV can observe that the geographical position of the equipment EQ of the driver (or of the vehicle) coincides with the geographic location of said space. The sensor associated with said space can also detect the presence of said driver/vehicle, in particular when said sensor is a camera. This type of sensor can then send a photo of the driver or of the license plate of the vehicle that they are driving to the server SERV. The equipment EQ of the driver or the equipment VEQ of the vehicle that they are driving can also send (automatically or following the pressing of a dedicated button) its ID to the controller CONT which transfers it to the server SERV.

When the server SERV has received information making it possible for it to determine that an identified driver is using one of the spaces in a geographical arrival area, said server can again modify one or more of the parking characteristics allocated to said space by the controller in question. In particular, it can increase the authorized parking time. For example, if the time allocated before their arrival was 5 minutes, the server SERV can increase this time to 120 minutes, even 12 hours, as soon as the driver uses the space. Alternatively or complementarily, the server SERV can also again modulate the pricing applied by the controller in question, for example by lowering the price to €0.10/minute and/or by making parking free for a certain period. This is another way to encourage the use of vehicles, making it possible to reduce traffic congestion and pollution and/or reward drivers who use this type of vehicle.

Various examples of the method according to the invention will now be described with reference to the flowcharts of FIGS. 5 and 6.

Figure 5:
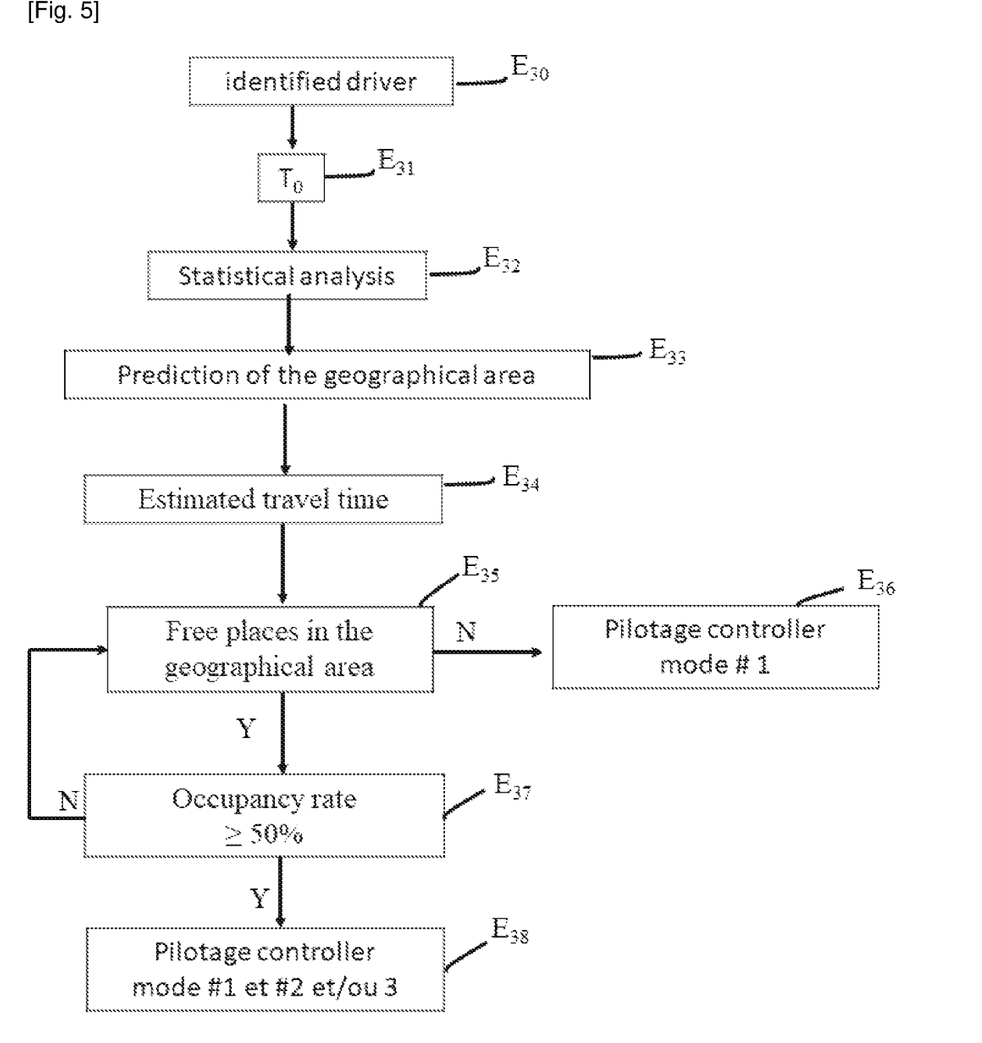
FIG. 5 is a flow chart illustrating the steps of the method according to the invention, according to one embodiment.

In FIG. 5, the server SERV takes as reference, an identified driver—or an identified vehicle—for the implementation of the method (E30). The process is initiated at T0, for example, as soon as the driver uses a vehicle from a car-sharing fleet and the latter changes from an "Unavailable for reservation" to "Available for reservation" status (E31). The server SERV performs a statistical analysis (E32) of the historical navigation data of the driver to predict the geographical area to which the driver will be heading (E33). The SERV server determines the estimated arrival time of the driver in this geographical arrival area (E34). The server SERV interrogates the database BAS to know if there is at least one free (unoccupied and available) space in the arrival area (E35).

If no space is free (E36), the server SERV controls the controller such that the first space which is free is placed in a "reserved" status (mode #1).

If at least one space is free, the server SERV determines the occupancy rate of this space (E37). This rate is derived from the statistical analysis of historical data recorded in the database BAS and which relates to the status of said space.

If the occupancy rate is lower than a threshold value (for example, 50%), the server SERV can loop the process back to the E35 step of interrogating the database BAS to know the number of free spaces.

If the occupancy rate is greater than or equal to the threshold value, the server SERV controls the controller (E38) to modulate the authorized parking time allocated to the free space (mode #2) and/or modulate the pricing applied to said space (mode #3) and/or put said space in a "reserved" status (mode #1).

Figure 6:
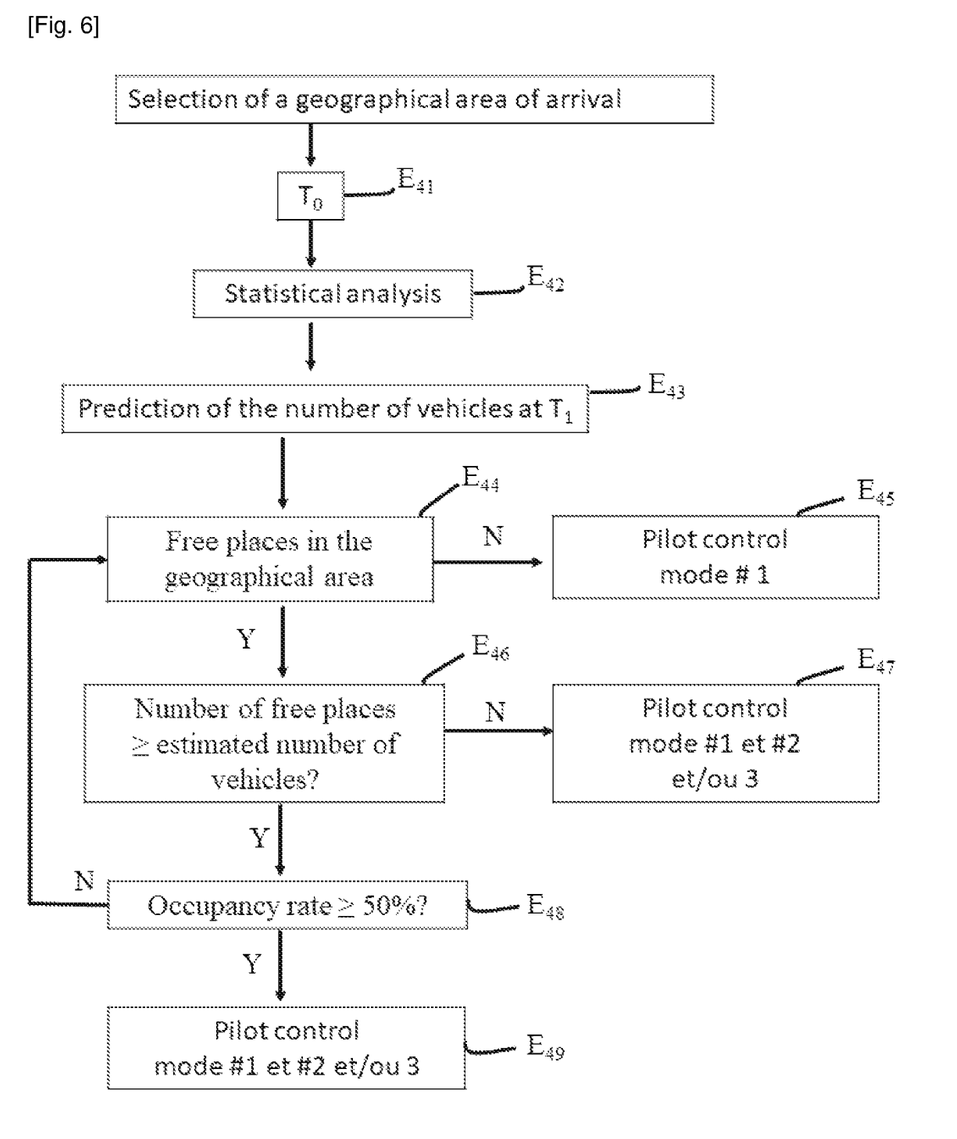
FIG. 6 is a flow chart illustrating the steps of the method according to the invention, according to another embodiment.

In FIG. 6, the server SERV takes an identified geographical arrival area (E40) as a reference. The process is initiated at T0 (E41), for example at a characteristic busy hour, in particular at 6:00 pm every weekday, when the office is closed. It can also be a particular event, for example a concert, in an identified venue, on a Saturday night at 9:00 pm.

The server SERV performs a statistical analysis (E42) of the historical navigation data of identified vehicles and/or identified drivers, in order to predict—estimate—a number of vehicles (E43) which can arrive in the arrival area from an arrival time T1, for example from 6:30 pm.

The server SERV interrogates the database BAS (E44) to know if there are any free (unoccupied and available) spaces in the arrival area.

If no space is free (E45), the server SERV controls the controller such that each space which is free is placed in a "reserved" status (mode #1). This modification of the status of the spaces is carried out until the number of spaces placed in a "reserved" status is equal to the estimated number of vehicles.

If spaces are free, the server SERV compares the estimated number of vehicles with the number of free spaces (E46).

If the number of free spaces is less than the estimated number of vehicles, the server SERV controls the controller (E47) to modulate the authorized parking time allocated to said free spaces (mode #2) and/or modulate the pricing applied to said free spaces (mode #3) and/or put said free spaces in a "reserved" status (mode #1). The server SERV also controls the controller such that each space which is free is placed in a "reserved" status (mode #1).

If the number of free spaces is greater than or equal to the estimated number of vehicles, the server SERV determines the occupancy rate of these free spaces (E48). This rate is derived from the statistical analysis of historical data recorded in the database BAS and which relates to the status of said spaces.

If the occupancy rate is lower than a threshold value (for example, 50%), the server SERV can loop the process back to the step E44 of interrogating the database BAS to know the number of free spaces.

If the occupancy rate is greater than or equal to the threshold value, the server SERV controls the controller (E49) to modulate the authorized parking time allocated to the free spaces (mode #2) and/or modulate the pricing applied to said free spaces (mode #3) and/or put said free space in a "reserved" status (mode #1).

System

According to another aspect, the invention relates in particular to a system consisting of at least the server SERV configured to implement the parking space management method according to the invention.

Computer Program Product

Also, according to another aspect, the invention relates to a computer program product comprising code instructions for executing the parking space management method according to the invention, when it is executed by a processing unit of the computer server SERV.

The arrangement of the different elements and/or means and/or steps of the invention, in the embodiments described above, must not be understood as requiring such an arrangement in all the implementations. Furthermore, one or more characteristics outlined only in one embodiment can be combined with one or more other characteristics outlined only in another embodiment.

The invention claimed is:

1. A method for managing parking spaces for vehicles, which spaces are located in a geographical area and are associated with a controller configured to allocate one or more parking characteristics to said spaces, the method comprising:
    collecting and storing historical navigation data of identified vehicles and/or identified drivers,
    carrying out a statistical analysis of said stored data to predict the use of the spaces by the identified vehicles and/or the identified drivers,
    estimating an arrival time of at least one of the identified vehicles and/or at least one of the identified drivers, in the geographical area, the one or more parking characteristics being modified before said estimated arrival time, and
    modifying the one or more parking characteristics allocated by the controller according to the prediction of using the spaces, the one or more parking characteristics being modified before said estimated arrival time, if, before the estimated time of arrival, a space is occupied by an unidentified vehicle and/or driver, and applying a different modification of the one or more characteristics if, from the estimated time of arrival, said space is occupied by an identified vehicle and/or an identified driver;

wherein the one or more parking characteristics consist of: an occupied status, an unoccupied status, a reserved status, a time allocated, a time remaining, a time overrun or a price/hour.

2. The method according to claim 1, further comprising:

collecting and storing historical space occupancy data, determining a number of free spaces following the prediction of space use, calculating an occupancy rate of said free spaces, which calculation is based on a statistical analysis of said stored historical data.

3. The method according to claim 2, further comprising selecting at least one parking characteristic to be modified from a plurality of parking characteristics allocated by the controller, which selection depends on the calculated occupancy rate.

4. The method according to claim 2, further comprising modifying the parking characteristic(s), only if the calculated occupancy rate is greater than or equal to a threshold value.

5. The method according to claim 1, further comprising further modifying at least one parking characteristic allocated to a parking space when said space is used by an identified vehicle and/or an identified driver.

6. The method according to claim 1, wherein the modification of the parking characteristic comprises modulating the duration of the authorized parking time allocated by the controller to the spaces.

7. The method according to claim 1, wherein the modification of the parking characteristic comprises modulating the pricing applied by the controller when using the spaces.

8. The method according to claim 1, wherein the modification of the parking characteristic comprises placing the spaces in a "reserved" status.

9. The method according to claim 1, further comprising:

modifying one or more parking characteristics prior to the estimated arrival time, modifying one other or more other parking characteristics from the estimated arrival time.

10. A system comprising a computer server configured to implement the method according to claim 1.

11. A system for managing parking spaces for vehicles, which spaces are located in a geographical area and are associated with a controller configured to allocate one or more parking characteristics to said spaces, the system comprising:

a database wherein vehicles and/or drivers are identified, a database wherein collected historical navigation data of identified vehicles and/or identified drivers are stored, and a computer server configured for:

carrying out a statistical analysis of said stored data to predict the use of the spaces by the identified vehicles and/or the identified drivers, estimating an arrival time of at least one of the identified vehicles and/or at least one of the identified drivers, in the geographical area, the one or more parking characteristics being modified before said estimated arrival time, and generating and sending instructions to the controller to modify the one or more parking characteristics allocated by said controller, according to the predictions of the use of the spaces, the one or more parking characteristics being modified before said estimated arrival time, if, before the estimated time of arrival, a space is occupied by an unidentified vehicle and/or driver, and applying a different modification of the one or more characteristics if, from the estimated time of arrival, said space is occupied by an identified vehicle and/or an identified driver;

wherein the one or more parking characteristics consist of: an occupied status, an unoccupied status, a reserved status, a time allocated, a time remaining, a time overrun or a price/hour.

* * * * *